No. 884,831. PATENTED APR. 14, 1908.
C. A. LOHR.
ALTERNATING CURRENT GENERATOR.
APPLICATION FILED FEB. 2, 1906.
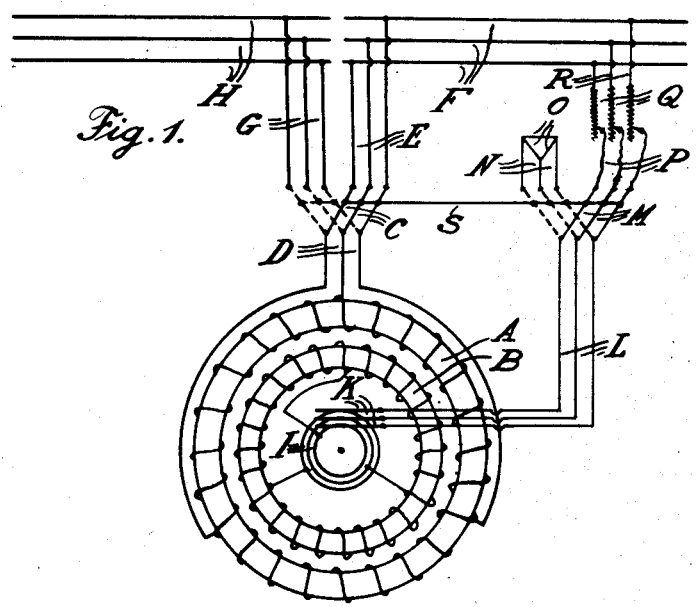
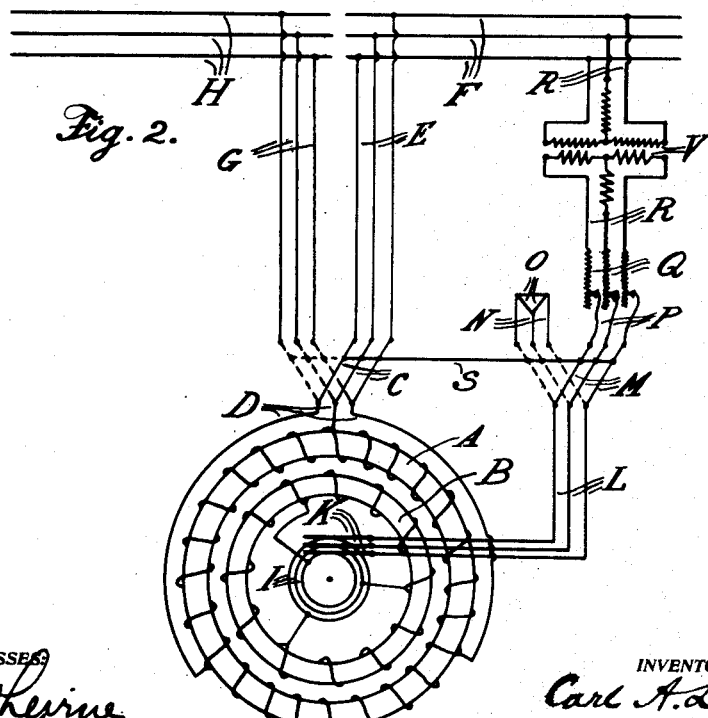
WITNESSES
INVENTOR
Carl A. Lohr
BY
ATTORNEYS.

UNITED STATES PATENT OFFICE.

CARL A. LOHR, OF WILKINSBURG, PENNSYLVANIA.

ALTERNATING-CURRENT GENERATOR.

No. 884,831.  Specification of Letters Patent.  Patented April 14, 1908.

Application filed February 2, 1906. Serial No. 299,115.

*To all whom it may concern:*

Be it known that I, CARL A. LOHR, a citizen of the Empire of Germany, residing in Wilkinsburg, in the county of Allegheny and State of Pennsylvania, have invented certain new and useful Improvements in Alternating-Current Generators, of which the following is a specification.

The invention herein described relates to alternating-current generators which are intended mainly for the direct coupling with high-speed prime movers, such as steam-turbines. With a frequency of 25 cycles per second for instance, the highest available speed which can be used in alternating-current generators of the ordinary construction is limited to 1500 revolutions per minute, while with a generator of the construction herein described the generator and prime-mover can be run at exactly twice the speed which, aside from a number of electrical advantages, is of advantage mainly on account of the better utilization of the steam-turbine. In addition to this my invention enables an operation of the generator at the same speed which is used for a generation of alternating-currents of a frequency of 25 cycles for instance, for a generation of alternating-currents of a higher frequency, or generally speaking, my generator may be alternately switched over from one alternating-current line to another of different frequency.

My invention will be best understood by reference to the accompanying drawing Figures 1 and 2. Each of these figures contains a part of my invention, but for a given case only one of the arrangements as shown in the figures of the drawing will give the most advantageous design. The arrangements shown in the two figures of the drawing differ only in that a transformer is inserted in the conductors leading to the rotor in the arrangement shown in Fig. 2.

Similar letters of reference indicate the same parts in the different figures of the drawing.

In Fig. 1 of the drawing A represents the stator of an alternating-current generator and B the rotor of the same. Both parts, stator and rotor, have alternating-current windings which are shown in the drawing as three-phase windings.

The windings of the stator A are connected by the triple-pole double throw switch C, when thrown as shown by the full drawn position of this switch, by the conductors D and E with an alternating-current line F. Furthermore the windings of the stator A can be connected, when switch C is thrown as shown by the dotted position, by means of the conductors D and G with another alternating-current line H. The alternating-current lines F and H are systems of different frequency. The windings of the rotor B can be connected over the collector-rings I, the brushes K, the conductors L, the triple-pole double-throw switch M, when thrown as shown by the dotted position, and the conductors N with the resistances or short-circuiting conductors O. Also the windings of the rotor B can be connected when the switch M is thrown as shown by the full drawn position over the collector-rings I, brushes K, conductors L, switch M, conductors P, regulating resistances Q, and the conductors R with the alternating-current line F. The switches C and M are simultaneously operated and may be mechanically connected as indicated by the line S in the drawing. Thus it will be seen that by a single switch-throw my generator may be connected alternately with stator and rotor to the line F, or only with the stator to the line H, the rotor being then closed upon itself. When the switches C and M are thrown as shown in their dotted positions, the generator will act as asynchronous induction-generator to the line H, and when the switches C and M are thrown as shown in their full drawn position, the generator will act as synchronous induction-generator to the line F. In order to secure a successful operation of this generator with both alternating-current lines H and F, the frequency of the line F must be over one half of the frequency of the line H.

Suppose the frequency of the alternating-current line F be 15 cycles per second, which frequency will be largely used in the near future for alternating-current railway work, the number of poles of the generators be two, as shown in the drawing, and the switches C and M be thrown as shown in the full drawn position, the generator will supply electric energy to the line F when driven at a speed of 1800 rotations per minute. With the same speed, when the switches C and M are thrown as shown in the dotted position, so as to connect the stator A with the line H and so as to close the rotor B upon itself, the generator will supply electric energy to the line H, when the frequency of this line is such as to produce in the stator A a magnetic rotary field rotating with a speed less than 1800 rotations p. m. Obviously the frequency of the line H must then be less than 30 cycles per second. Both alternating-current lines F and H must be supplied by other generators, as the generator here described must be excited by alternating-currents of the proper frequency. Thus my generator here described is particularly well suited to act as additional generator to a system of two alternating-current lines and may be easily switched over from one line to the other by a single switch-throw, without changing the speed of the prime-mover.

A special case in which the alternating working on lines of different frequency is of importance may be illustrated in the following example: Supposing a power-station comprises a group of alternating-current generators which supply a line of 15 cycles per second for railway work, and a second group of alternating-current generators, which supply a line of a frequency about between 25 and 30 cycles per second for supplying incandescent lamps, which as known cannot be satisfactorily operated with a frequency below 20 cycles per second. The generators of the ordinary construction could not under retention of the same speed as required by the prime-mover, be shifted onto a line of different frequency, and it is therefore necessary that either group of generators must be sufficient for the full load of the line which it supplies. Experience has shown that the maximum loads of two such lines are never reached at the same time, and it is therefore readily discernible that one or more generators may be dispensed with when generators of my improved system are used, as the same permit, without change of speed, the alternating working to that line which is carrying the heavier load. My generator of the synchronous (double-connected) type works best to a line of lower frequency, while as a generator of the asynchronous (single-connected) type to a line of higher frequency.

In Fig. 2 I have shown the same arrangement as in Fig. 1, with the only addition of a transformer V, in case a lower voltage is desired for the rotor, when connected to the line F, or what is more important, in case a lower resistance is required, when the rotor is acting as short-circuited member, the stator then being connected to the line H.

The regulating resistances Q serve to equalize the rotary fields in the stator and rotor when both members are connected to the alternating-current line F. The purpose of these regulating resistances is to avoid cross-currents flowing between the windings of stator and rotor. The connection of the rotor over a transformer would re-result in a lower resistance of the rotor windings and therefore require a less slip over synchronism for a given output as asynchronous induction-generator. The arrangement with or without a transformer in the connections to the rotor has therefore an influence on the ratio of frequencies of the two alternating current lines.

In the case mentioned, having a generator-speed of 1800 rotations per minute and a frequency of 15 cycles per second in the alternating-current line F, the frequency of the alternating-current line H must be less than 30 cycles per second. If the frequency of this line be 25 cycles per second, the rotor-resistance must be higher, if the frequency of this line be 29 or almost 30 cycles p. s., the rotor-resistance must be lower in order to secure a satisfactory working of the generator to both alternating-current lines, and especially in order to secure a desired output of the generator when supplying the line H. Thus it will be seen that in the combination as described and shown in the drawing the transformer V is necessary for certain conditions and therefore forms a part of my invention.

The general principle of my invention may be illustrated by the following two examples:

Example 1. The generator consists similarly as an induction-motor whose rotor is provided with phase-windings and collector-rings of a rotary part (rotor), which is connected either directly or over a transformer with an alternating-current line, and of a stationary part (stator), which is also provided with alternating-current windings, and which is also connected with said alternating-current line. With this arrangement the magnetic alternating of rotary field which is produced in the rotor exerts, in connection with the mechanical rotation of the rotor, an inducing effect on the windings of the stator, while the alternating or rotary field which is induced in the stator has in return an inducing effect on the windings of the rotor. In this special case therefore, the generator acts as a synchronous generator and represents the "double-connected" type of my generator.

Example 2. The rotor of the generator just described is switched out of the alternating-current line and its windings switched over the collector-rings into a resistance or short-circuited. The stator of the generator may be connected to the same line or it may be connected with a line of different frequency. With this arrangement the machine operates as asynchronous generator and represents the "single-connected" type of my generator.

As explained in the foregoing description, a main object of the present invention is an alternating-current generator, which can be readily switched over from one alternating-current line to another of different frequency, without changing the speed of the generator or its prime-mover. My generator can be used in this manner in every case with alternating-current lines, the frequencies of which are in such relation to each other, that the frequency of the one line is somewhat more than one half of the frequency of the other line. The synchronous operation of the generator has to be applied when supplying the line of lower frequency, and the asynchronous operation, when supplying the line of higher frequency.

In the following table I have given the speed of the generator for a two-pole construction and a few frequency-combinations which can be alternately obtained, without changing the speed of the generator.

| Line frequency p. s. | | Generator-speed p. m. |
|---|---|---|
| Synchr. | Asynchr. | |
| 15 | below 30 | 1800 |
| 20 | below 40 | 2400 |
| 25 | below 50 | 3000 |
| 30 | below 60 | 3600 |

I do not desire to limit my invention to the application of two oppositely-rotating magnetic fields in stator and rotor of a generator, as this idea has been used heretofore for motors, where it could not be applied with any practical success, as such motor is synchronous and as no electrical means are known by which such a motor can be started. The present invention employs this principle in Example 1, but enlarged and arranged in such a manner as to produce special electrical and magnetic functions.

As previously explained an essential addition for certain cases is therefore: a transformer, inserted in the connections to the rotor, not only for obviating too high tensions in the rotary part, but mainly for obtaining the short-circuiting of the rotor, or more precisely expressed, for obtaining a certain resistance of the rotor-windings and therefore a satisfactory running of the machine as asynchronous generator to an alternating current line of other frequency. Furthermore in a parallel connection of stator and rotor when supplying the line F, an essential addition is: a device for regulating the strength of the magnetic field of one member of the generator, which is represented in the drawing in the regulating resistances Q.

It is obvious that the machine can be run in every case in which it is operated as a generator, also as a motor, without making any changes in the switch-device or in other parts. Only in the case in which the machine is run as a "double-connected" motor, the regulating-resistances in the circuit of the rotor have the additional purpose, viz. to speed up the motor without external means, purely by electrical means, to the higher synchronous speed in such a manner that the rotor running asynchronously with the speed of the stator field is sped up by gradually impressing a second rotary field to the rotor, as stated in the application filed by me on September 7, 1905, Serial No. 277,336.

While I desire to extend all the claims which I make for the generator to the machine when running as a motor as this will be readily understood by any one skilled in the art, I desire to confine myself in this application and in the claims, to a generator, inasmuch as the special arrangement as motor is described in my pending application Ser. No. 277,336, of September 7, 1905, I beg to state, however, that the invention herein described consists not only in a simple reversing of the motor so as to use it as a generator, but as will appear from the description and drawing, in the combination with two alternating current lines, in a manner which is applicable to a generator, but generally for a motor out of the scope of application.

Having thus described my invention, I claim as new and desire to secure by Letters Patent—

1. In combination, with two alternating-current lines of different frequency and an alternating-current generator having alternating-current windings on both of its members, means for alternately connecting at will the windings of both members of said generator to one of said alternating-current lines, or the winding of one member of said generator to the other of said alternating-current lines, having the winding of the other member of said generator closed upon itself.

2. In combination, with two alternating current lines of different frequency and an alternating-current generator having alternating-current windings on both of its members, means for connecting one member of said generator directly and the other member of said generator over a transformer with the one of said alternating-current lines, means for connecting said one member of said alternating-current generator with the other of said alternating-current lines and closing said other member upon itself, the secondary winding of said transformer and the winding of said other member being designed so as to produce with the same generator-speed the same or approximately the same amount of electrical energy, when said generator is switched over from one line to the other, all substantially as described.

In testimony, that I claim the foregoing as my invention, I have signed my name in presence of two subscribing witnesses.

CARL A. LOHR.

Witnesses:
HANS WEICHSEL,
R. L. HOFFMAN.